(12) United States Patent
Kishi et al.

(10) Patent No.: US 7,833,677 B2
(45) Date of Patent: Nov. 16, 2010

(54) NONAQUEOUS ELECTROLYTE BATTERY

(75) Inventors: Takashi Kishi, Yokosuka (JP); Takashi Kuboki, Tokyo (JP); Satoshi Mikoshiba, Yamato (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 679 days.

(21) Appl. No.: 11/683,605

(22) Filed: Mar. 8, 2007

(65) Prior Publication Data

US 2007/0281209 A1 Dec. 6, 2007

(30) Foreign Application Priority Data

May 30, 2006 (JP) ............................. 2006-149842

(51) Int. Cl.
*H01M 6/04* (2006.01)
(52) U.S. Cl. .................................. 429/498
(58) Field of Classification Search .................. 429/188, 429/324
See application file for complete search history.

(56) References Cited

U.S. PATENT DOCUMENTS

| 6,682,855 | B2 * | 1/2004 | Michot et al. ............... 429/306 |
| 7,468,224 | B2 * | 12/2008 | Li et al. ....................... 429/232 |
| 7,479,353 | B2 * | 1/2009 | Hollenkamp et al. ........ 429/324 |
| 2005/0164082 | A1 | 7/2005 | Kishi et al. |
| 2006/0068282 | A1 | 3/2006 | Kishi et al. |
| 2006/0100323 | A1 * | 5/2006 | Schmidt et al. ............. 524/106 |
| 2006/0204855 | A1 | 9/2006 | Saruwatari et al. |
| 2006/0210876 | A1 | 9/2006 | Kuboki et al. |
| 2007/0026318 | A1 | 2/2007 | Kishi et al. |

FOREIGN PATENT DOCUMENTS

| JP | 4-349365 | 12/1992 |
| JP | 11-86905 | 3/1999 |
| JP | 2002-222740 | 8/2002 |
| JP | 2004-247176 | 9/2004 |
| JP | 2005-353452 | 12/2005 |
| JP | 2006-092974 | 4/2006 |
| WO | WO 2005/049555 A1 | 6/2005 |

OTHER PUBLICATIONS

Rajendra P. Singh, et al., "New dense fluoroalkyl-substituted imidazolium ionic liquids", Tetrahedron Letters 43, 2002, pp. 9497-9499.

* cited by examiner

*Primary Examiner*—Melvin C Mayes
*Assistant Examiner*—Melissa Stalder
(74) *Attorney, Agent, or Firm*—Oblon, Spivak, McClelland, Maier & Neustadt, L.L.P.

(57) ABSTRACT

This invention provides a nonaqueous electrolyte battery that has excellent output characteristics, is small in individual difference, and is more stable. The nonaqueous electrolyte battery comprises a negative electrode and a positive electrode that contain or can occlude and release lithium, a lithium salt-containing ionic liquid and is characterized in that the electrolyte contains a cation containing a fluoroalkyl group attached through a methylene chain to a basic structure selected from the group consisting of imidazolium, piperidinium, and pyrrolidinium structures.

19 Claims, 1 Drawing Sheet

NONAQUEOUS ELECTROLYTE BATTERY

CROSS-REFERENCE TO RELATED APPLICATIONS

This application is based upon and claims the benefit of priority from the prior Japanese Patent Applications No. 149842/2006, filed on May 30, 2006; the entire contents of which are incorporated herein by reference.

BACKGROUND OF THE INVENTION

1. Field of the Invention

The present invention relates to nonaqueous electrolyte battery.

2. Background Art

In recent years, the market of portable information equipment such as portable telephones (cellular phones) and small-sized personal computers is being expanded. With the progress of a reduction in size and weight of these equipment, there is an increasing demand for small-size and light-weight power supplies. Lithium ion rechargeable batteries having high energy density are extensively used in these portable equipment and are still being currently studied. The advance of technology in recent years has led to a reduction in size of a variety of equipment such as digital audio equipment and POS terminals. When the equipment is rendered portable by virtue of size reduction, a built-in battery, which can eliminate the need to use a power cord, is required instead of the conventional alternating-current power supply, and applications which require the use of rechargeable batteries are also being expanded. Also for information equipment such as personal computers and portable telephones in which rechargeable batteries have hitherto been used, an improvement in characteristics is always required. Required characteristics range widely, that is, not only capacity but also operation at elevated temperatures, safety at elevated temperatures, operation at low temperatures, high output, long-term stability and the like. For example, lead-acid batteries, nickel cadmium rechargeable batteries, and nickel hydrogen rechargeable batteries have hitherto been used as rechargeable batteries. However, there is still room for improvement in small size and light weight. Rechargeable batteries with a nonaqueous electrolyte have small size and light weight and have high capacity and thus have become used in the personal computers and portable telephones (cellular phones), as well as in digital cameras, video cameras and the like.

Batteries called lithium rechargeable batteries or lithium ion rechargeable batteries in which, for example, lithium-containing cobalt composite oxides, lithium-containing nickel composite oxides, and lithium-containing titanium oxides capable of occluding and releasing lithium, and carbonaceous materials are used as positive electrode materials and negative electrode materials, are among this type of rechargeable batteries with a nonaqueous electrolyte.

In this connection, rechargeable batteries with a nonaqueous electrolyte using a combustible organic solvent as an electrolysis solution have been put to practical use and commercialized. In order to improve stability under a higher-temperature environment or safety upon overcharge or breaking of the battery, however, studies have been made to use an ionic liquid, which has no flash point and is liquid at room temperature, as an electrolyte for enhancing the safety. Also for a primary battery which is easy to ensure safety as compared with the rechargeable battery because charging is not carried out, the application of ionic liquids has been studied, for example, from the viewpoint of improving the safety. For example, rechargeable batteries with a nonaqueous electrolyte using a lithium metal oxide in the positive electrode, using a lithium metal, a lithium alloy, or a carbonaceous material capable of absorbing and releasing a lithium ion, and an ionic liquid composed of a lithium salt, an aluminum halide, and a quaternary ammonium halide as an electrolyte are disclosed as rechargeable batteries having excellent safety, for example, in Japanese Patent Laid-Open No. 349365/1992. Further, rechargeable batteries with a nonaqueous electrolyte comprising a positive electrode, a negative electrode comprising a carbonaceous material capable of absorbing and releasing a lithium ion, a fluoride anion of an element selected from boron, phosphorus, and sulfur, and an ionic liquid composed of a quaternary ammonium ion and a lithium ion are disclosed as rechargeable batteries having excellent safety and improved cycle life and discharge capacity, for example, in Japanese Patent Laid-Open No. 86905/1999.

The ionic liquid, however, have problems remaining unsolved that the viscosity is higher than that of carbonate-type or other nonaqueous solvents used in conventional nonaqueous electrolyte batteries and, thus, the impregnation of the ionic liquid into the separator and positive and negative electrodes is difficult or impossible.

BRIEF SUMMARY OF THE INVENTION

An object of the present invention is to provide a nonaqueous electrolyte battery that has been improved in electrolyte impregnation properties in nonaqueous electrolyte batteries with an ambient temperature ionic liquid and has excellent properties.

According to the present invention, there is provided a rechargeable nonaqueous electrolyte battery, comprising a negative electrode and a positive electrode that contain or can absorb and release lithium, a lithium salt-containing ionic liquid, wherein a cation represented by general formula (1) is contained in the ionic liquid:

$$A^{+}\text{-}(CH_2)_n\text{-}(CF_2)_m\text{-}CF_3 \qquad (1)$$

wherein $A^+$ represents a basic structure selected from the group consisting of imidazolium, piperidinium, and pyrrolidinium structures, n is an integer of 2 to 10, and m is an integer of 1 or more and 12 or less.

According to the present invention, the impregnation properties of an ionic liquid into positive and negative electrodes, and the separator, in a nonaqueous electrolyte battery comprising the ionic liquid can be enhanced, whereby the simplification and speed up of an electrolyte filling step in a battery production process can be realized and, further, a nonaqueous electrolyte battery that has excellent output characteristics, is small in individual difference of performances, can be realized.

DETAILED DESCRIPTION OF THE INVENTION

Figure 1:
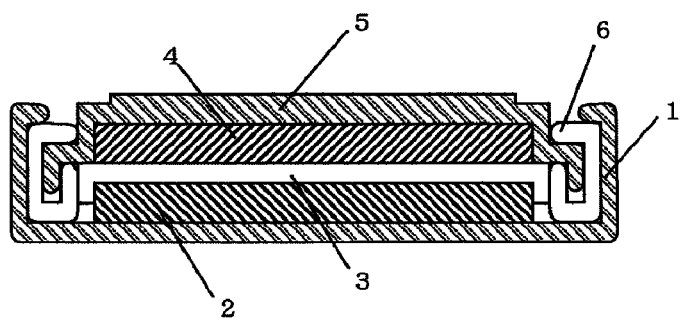
FIG. 1 is a cross-sectional view illustrating a coin-type nonaqueous electrolyte battery.

The present inventors have made extensive and intensive studies with a view to attaining the above object and, as a result, have found that the impregnation properties of an electrolyte into positive and negative electrodes and the separator are improved by using a cation-containing ionic liquid represented by the above general formula (1). This effect is considered to derive from surface active properties of the terminal perfluoroalkyl group of general formula (1). Further, since the above cation is an ion, in such a state that the cation is mixed or dissolved in the ionic liquid, attractive force occurs between the cation and the ion constituting the ionic liquid. Accordingly, the ionic liquid becomes nonvolatile as a whole and basically has no flash point. Therefore, unlike the conventional surfactant, there is no possibility that ionic liquid as the surfactant is evaporated. As a result, high stability can be realized even under high-temperature environment. Further, depending upon the cation structure and the counter anion species, the ionic liquid can be brought to a molten state having surface active properties as a whole, and it is possible for the ionic liquid to simultaneously have nonvolatible and inflammable properties and simpleness of compounding/mixing as a liquid.

When the basic structure of the cation has an imidazolium structure, a piperidinium structure, or a pyrrolidinium structure, the group of general formula (1) can develop a high level of surface active properties.

In general formula (1), n is an integer of 2 or more. When n is 1 or less, difficulties are encountered in the synthesis, and, consequently, the cost is disadvantageously high. On the other hand, when n is 2 or more, an improvement in surface active properties can be expected. When the n value is excessively large, due to increased molecular weight of the cation, the melting point of the cation-containing compound is likely to increase. Accordingly, n is preferably 10 or less. n is more preferably 5 or less from the viewpoint of viscosity. From the viewpoint of maintaining impregnation properties into the positive electrode and negative electrode, m should be 1 or more. On the other hand, in order to provide a high level of compatibility with the ionic liquid, m should be an integer of 12 or less. Further, from the viewpoint of expanding properties, m is preferably 6 or less.

The basic structure of the cation is preferably an imidazolium structure because of its low viscosity. Further, when the ionic liquid contains a cation having an imidazolium structure, the cation is more preferably an imidazolium structure because the compatibility is good. A particularly preferred imidazolium structure is represented by general formula (2).

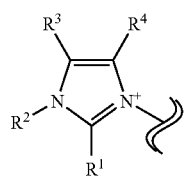

(2)

wherein $R^1$, $R^3$, and $R^4$ each independently represent a substituent having 8 or less carbon atoms and comprising at least one element selected from the group consisting of carbon, hydrogen, and oxygen, $R^2$ represents a substituent having 1 or more and 8 or less carbon atoms and comprising at least one element selected from the group consisting of carbon, hydrogen, and oxygen, and $R^1$ to $R^4$ may be the same or different.

From the viewpoint of low viscosity, preferably, $R^1$, $R^3$, and $R^4$ represent hydrogen, and $R^2$ represents a methyl group. Further, from the viewpoint of lowered reactivity, preferably $R^1$ and $R^2$ represent a methyl or ethyl group, and $R^3$ and $R^4$ represent hydrogen.

A combination of the cation of general formula (2) with a bistrifluoromethylsulfonylamide anion (TFSI) or a bispentafluoroethylsulfonylamide anion (BETI) is more preferred because an ionic liquid can be provided. In particular, in general formula (1), more preferably, n=2 and m=1, because the compound containing a cation of general formula (I) can be brought to an ionic liquid and the molecular weight is also low.

Further, a combination which can provide an ionic liquid as a whole is possible by using, as a counter anion, for example, a tetrafluoroboric acid anion ($BF_4^-$), a hexafluorophosphoric acid anion ($PF_6^-$), a trifluoromethylsulfonic acid anion, a bistrifluoromethylsulfonylamide anion (TFSI), a bispentafluoroethylsulfonylamide anion (BETI), or a dicyanamide anion (DCA).

When the cation-containing compound of general formula (1) functions also as an ionic liquid, a lithium salt can be dissolved in the above compound per se to prepare an ionic liquid. In this case, an ionic liquid having a very high level of wetting properties can be provided.

In general, mixing of the above cation-containing compound into an ionic liquid having a higher level of lithium salt dissolving properties or a lower viscosity is preferred. In this case, the content of the compound is preferably not less than 0.01% by weight and not more than 5% by weight. In order to provide satisfactory impregnation properties, the content is preferably not less than 0.01% by weight. When an excessive amount of the compound is added, no significant improvement in surface active properties can be achieved. Further, in this case, there is a tendency toward a deterioration in other properties possessed by the ionic liquid before the addition of the compound. Accordingly, the addition amount of the compound is preferably not more than 5% by weight.

Each embodiment of the present invention will be described with reference to the accompanying drawings. Like constructions have the same reference characters throughout the description of the embodiments, and the overlapped description thereof will be omitted. The drawings are typical diagrams for explaining the invention and promoting an understanding of the invention, and the shape, dimension, ratio and the like are partly different from those of an actual device. They may be properly varied by taking into consideration the following description and conventional techniques.

FIG. 1 is a cross-sectional view showing a nonaqueous electrolyte battery according to the present invention. As shown in FIG. 1, a pellet-shaped positive electrode 2 is housed within a metallic positive electrode container 1 which serves also as a positive electrode terminal. A separator 3 is stacked on a positive electrode 2. A pellet-shaped negative electrode 4 is stacked on a separator 3. The ionic liquid has been impregnated into the positive electrode 2, the separator 3, and the negative electrode 4. A metallic negative electrode container 5, which serves also as a negative electrode terminal, is fixed by caulking through an insulating gasket 6 to the positive electrode container 1 in such a state that the inner face of the metallic negative electrode container 5 comes into contact with the negative electrode 4. The positive electrode container 1 and the negative electrode container 5 are formed of, for example, stainless steel or iron. Further, the insulating gasket 6 may be formed of, for example, polypropylene, polyethylene, polyvinyl chloride, polycarbonate, or teflon.

The positive electrode, negative electrode, separator, and nonaqueous electrolyte will be described.

1) Positive Electrode

The positive electrode contains a positive electrode active material and may additionally contain an electron conductive material such as carbon (hereinafter referred to as "conductive material") and a binder for forming a sheet-shaped or pellet-shaped positive electrode. A base material such as an electron conductive metal may be used as a current collector, and the positive electrode may be used in contact with the current collector.

Examples of positive electrode active materials include metal oxides and chalcogen compounds such as iron sulfide, titanium disulfide, and molybdenum disulfide that can absorb and release a lithium ion. Such metal oxides include, for example, lithium-containing cobalt composite oxides, lithium-containing nickel cobalt composite oxides, lithium-containing nickel composite oxides, lithium manganese composite oxides, and lithium-containing vanadium oxides. Among them, a lithium composite oxide containing at least one metal element selected from the group consisting of cobalt, manganese, and nickel is preferred. Lithium-containing cobalt composite oxides, lithium-containing nickel cobalt composite oxides, lithium-containing manganese composite oxides and the like, which have a charge/discharge potential of not less than 2.5 V relative to the lithium metal potential, are more preferred because a high battery capacity can be realized. Further, from the viewpoint of suppressing a decomposition reaction of an ionic liquid on the surface of the positive electrode at room temperature or above, lithium-containing cobalt nickel manganese composite oxides represented by $LiCo_xNi_yMn_zO_2$, wherein x+y+z=1, $0<x\leq0.5$, $0\leq y<1$, and $0\leq z<1$, is preferred.

Binders usable herein include polytetrafluoroethylene (PTFE), polyvinylidene fluoride (PVdF), ethylene-propylene-diene copolymer, and styrene-butadiene rubber.

For example, foils, thin plates, meshes, or wire gauzes of metals such as aluminum, stainless steel, and titanium may be used as the current collector.

The positive electrode active material and the conductive material can be pelletized or formed into a sheet by adding the above binder to the positive electrode active material and conductive material and kneading and rolling the mixture. Alternatively, a method may also be adopted in which a mixture containing the positive electrode active material, the conductive material, and the binder is dissolved or suspended in a solvent such as toluene or N-methylpyrrolidone (NMP) to prepare a slurry which is then coated and dried onto the current collector to form a sheet.

2) Negative Electrode

The negative electrode contains a negative electrode active material and has been molded into pellets, thin plates, or sheets. The negative electrode may if necessary contain, for example, conductive materials and binders.

The negative electrode active material contains a negative electrode active material, which absorbs and releases a lithium ion at a lower potential than the action potential of the positive electrode, and may additionally contain an electron conductive material such as carbon (hereinafter referred to as "conductive material") and a binder for forming a sheet-shaped or pellet-shaped negative electrode. A base material such as an electron conductive metal may be used as a current collector, and the negative electrode may be used in contact with the current collector. In the case of a rechargeable non-aqueous electrolyte battery, the active material is preferably such that the charge/discharge potential of the negative electrode is not less than 0.5 V relative to the potential to the metallic lithium (more noble than 0.5 V). This is so because, in the negative electrode active material which provides a negative electrode charge/discharge potential of less than 0.5 V relative to the potential of the metallic lithium, a decomposition reaction with an ionic liquid occurs. When the charge/discharge potential of the negative electrode is not less than 0.5 V and not more than 3 V relative to the potential of the metallic lithium, the decomposition reaction of the ionic liquid can be suppressed and, at the same time, a high battery voltage can be provided. The charge/discharge potential of the negative electrode is more preferably not less than 0.5 V and not more than 2 V.

In the case of a primary battery, since there is no charging process, a reaction of the negative electrode active material with the ionic liquid t is suppressed. Accordingly, advantageously, for example, metallic lithium and aluminum lithium alloy can be used, and the voltage of the battery can be enhanced.

The negative electrode active material, which provides a negative electrode charge/discharge potential of not less than 0.5 V relative to the potential of the metallic lithium, is preferably a metal oxide, a metal sulfide, a metal nitride, or an alloy. Such metal oxides include, for example, titanium-containing metal composite oxides, amorphous tin oxides such as $SnB_{0.4}P_{0.6}O_{3.1}$, tin silicon oxides such as $SnSiO_3$, silicon oxide such as $SiO$, and tungsten oxides such as $WO_3$. Among them, titanium-containing metal composite oxides are preferred.

Titanium-containing metal composite oxides include, for example, lithium titanium oxides and, in the synthesis of the oxide, lithium-free titanium-type oxides. Lithium titanium oxides include, for example, spinel-type lithium titanate, for example, $Li_{4+x}Ti_5O_{12}$, wherein x is $-1\leq x\leq 3$, ramsdellite-type lithium titanate, for example, $Li_{2+x}Ti_3O_7$, wherein x is $-1\leq x\leq 3$. Titanium-type oxides include $TiO_2$ and metal composite oxides containing titanium (Ti) and at least one element selected from the group consisting of phosphorus (P), vanadium (V), tin (Sn), copper (Cu), nickel (Ni), and iron (Fe). Preferably, $TiO_2$ is of anatase type, has been subjected to heat treatment at 300 to 500° C., and has low crystallinity. Metal composite oxides containing titanium (Ti) and at least one element selected from the group consisting of phosphorus (P), vanadium (V), tin (Sn), copper (Cu), nickel (Ni), and iron (Fe) include, for example, $TiO_2$—$P_2O_5$, $TiO_2$—$V_2O_5$, $TiO_2$—$P_2O_5$—$SnO_2$, and $TiO_2$—$P_2O_5$—MeO wherein Me represents at least one element selected from the group consisting of copper, nickel, and iron. Preferably, this metal composite oxide has low crystallinity and has a microstructure in which a crystal phase and an amorphous phase exist together, or the amorphous phase exists solely. This microstructure can significantly improve cycle performance. Among others, metal composite oxides containing at least one element selected from the group consisting of lithium titanate oxides, titanium (Ti), phosphorus (P), vanadium (V), tin (Sn), copper (Cu), nickel (Ni), and iron (Fe) are preferred.

Metal sulfides include, for example, titanium sulfide such as $TiS_2$, molybdenum sulfide such as $MOS_2$, and iron sulfide such as $FeS$, $FeS_2$, and $Li_xFeS_2$.

Metal nitrides include, for example, lithium cobalt nitrides, for example, $Li_xCo_yN$ wherein $0<x<4$ and $0<y<0.5$.

The negative electrode active material is most preferably lithium titanium oxide or iron sulfide from the viewpoint of suppressing a deterioration by a side reaction of the ionic liquid on the surface of the negative electrode active material.

A mixture of two or more negative electrode active materials may also be used. The negative electrode active material may be in various forms such as flaky, fibrous, and spherical forms.

Conductive agents usable herein include electron conductive materials such as carbon and metals. Preferably, the conductive agent is, for example, a powder or fibrous powder form.

Binders usable herein include, for example, polytetrafluoroethylene (PTFE), polyvinylidene fluoride (PVdF), styrene-butadiene rubber, and carboxymethylcellulose (CMC). Current collectors usable herein include, for example, foils, thin plates, meshes, or wire gauzes of metals such as copper, stainless steel, and nickel.

The negative electrode active material and the conductive material can be pelletized or formed into a sheet by adding the above binder to the negative electrode active material and conductive material and kneading and rolling the mixture. Alternatively, a method may also be adopted in which a mixture containing the negative electrode active material, the conductive agent, and the binder is dissolved or suspended in a solvent such as water or N-methylpyrrolidone (NMP) to prepare a slurry which is then coated and dried onto the current collector to form a sheet.

3) Nonaqueous Electrolyte

The nonaqueous electrolyte contains an ionic liquid and a cation of general formula (1):

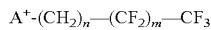

$$A^+\text{-}(CH_2)_n\text{-}(CF_2)_m\text{-}CF_3$$

wherein $A^+$ represents a basic structure selected from the group consisting of an imidazolium structure, a piperidinium structure, and a pyrrolidinium structure;

n is an integer of 2 to 10; and m is an integer of not less than 1 and not more than 12.

The ionic liquid refers to a salt that at least a part thereof is liquid at room temperature, that is, in a temperature range in which the rechargeable battery is used. The ionic liquid embraces a salt which becomes a liquid as a whole at room temperature by mixing a salt which is not liquid at room temperature such as lithium tetrafluoroborate. The cation forms a pair with an anion. The anion is the same type as the anion contained in the ionic liquid, or alternatively to from a different anion.

The organic material cation for forming the ionic liquid is not particularly limited, and examples thereof include unsaturated quaternary ammonium ions and saturated quaternary ammonium ions. One or two or more types of cations may be used as the cation in the ionic liquid.

Unsaturated quaternary ammonium ions include, for example, those having an imidazolium structure such as 1-ethyl-3-methylimidazolium, 1-methyl-3-propylimidazolium, 1-methyl-3-isopropylimidazolium, 1-butyl-3-methylimidazolium, 1-ethyl-2,3-dimethylimidazolium, and 1-ethyl-3,4-dimethylimidazolium, those having a pyridinium structure such as N-propylpyridinium, N-butylpyridinium, N-tert-butylpyridinium, N-tert-pentylpyridinium, those having a pyrrolidinium structure such as N-methyl-N-propylpyrrolidinium ion, N-butyl-N-methylpyrrolidinium ion, N-methyl-N-pentylpyrrolidinium, and N-propoxyethyl-N-methylpyrrolidinium, and those having a piperidinium structure such as N-methyl-N-propylpiperidinium, N-methyl-N-isopropylpiperidinium, N-butyl-N-methylpiperidinium, N-isobutyl-N-methylpiperidinium, N-sec-butyl-N-methylpiperidinium, N-methoxyethyl-N-methylpiperidinium, and N-ethoxyethyl-N-methylpiperidinium.

Compounds for providing saturated quaternary ammonium ions include, for example, N-butyl-N,N,N-trimethylammonium, N-ethyl-N,N-dimethyl-N-propylammonium, N-butyl-N-ethyl-N,N-dimethylammonium, and N-butyl-N,N-dimethyl-N-propylammonium.

Among the unsaturated quaternary ammonium ions, ions having an imidazolium structure, a pyrrolidinium structure, or a piperidinium structure are preferred because they have high reduction resistance and can realize an improvement in storage stability and cycling properties by suppressing a side reaction.

Further, among unsaturated quaternary ammonium ions, cations having an imidazolium structure are more preferred because they can provide an ionic liquid having low viscosity and, when used as a nonaqueous electrolyte, can realize high battery output characteristics.

The anion for forming the ionic liquid is not particularly limited. At least one anion selected, for example, from tetrafluoroboric acid anion ($BF_4$—), hexafluorophosphoric acid anion ($PF_6$—), trifluoromethylsulfonic acid anion, bistrifluoromethylsulfonylamide anion (TFSI), bispentafluoroethylsulfonylamide anion (BETI), and dicyanamide anion (DCA) may be used.

Preferably, the ion liquid contains a lithium salt from the viewpoint of providing a large battery capacity. At least one lithium salt may be selected, for example, from lithium tetrafluoroborate ($LiBF_4$), lithium hexafluorophosphate ($LiPF_6$), lithium trifluoromethylsulfonate, lithium bistrifluoromethylsulfonylamide (LiTFSI), lithium bispentafluoroethylsulfonylamide (LiBETI), and lithium dicyanamide (LiDCA).

The concentration of the lithium salt in the nonaqueous electrolyte is preferably 0.1 to 2.5 mol/liter. In order to maintain satisfactory ion conductivity for preventing a lowering in discharge capacity, the lithium salt concentration is preferably not less than 0.1 mol/liter. On the other hand, in order to prevent an increase in viscosity of the ionic liquid and to maintain impregnation properties into positive and negative electrode active materials and the like for preventing a lowering in discharge capacity, the lithium salt concentration is preferably not more than 2.5 mol/liter. Further, the lithium salt concentration is more preferably 0.5 to 1.8 mol/liter from the viewpoint of suppressing salt precipitation and maintaining satisfactory ion conductivity.

In order to provide the highest possible level of flame retardancy, the absence of any organic solvent other than the ionic liquid and lithium salt in the ionic liquid is preferred. However, other organic solvent may be contained, for example, from the viewpoint of attaining the effect of suppressing a side reaction within the battery. In this case, in order to maintain flame retardance, the addition amount is preferably not more than 10% by weight. When other organic solvent is added to control a chemical reaction within the battery, for example, from the viewpoint of suppressing a side reaction, the addition amount thereof is preferably such that, after the construction of the battery or after the completion of initial charge/discharge, the half or more of the addition amount is consumed. The addition amount is preferably either not more than 3% by weight or the number of moles calculated from the quantity of current of initial cycle irreversible capacity increment derived from the addition of the organic solvent.

4) Separator

The separator include porous films or nonwoven fabrics comprising polyolefin, polyester, cellulose, or polyvinylidene fluoride (PVdF), glass fibers, or synthetic resin nonwoven fabrics. Polyolefins include polyethylene and polypropylene. Polyesters include polyethylene terephthalate. Among them, polyolefins or polyesters are preferred because they can be formed into a porous film and a thin film. In particular, the porous film can be molten at a given temperature and can cut off current and thus is preferred from the viewpoint of improving the safety.

The nonaqueous electrolyte battery according to the present invention may be in a coin form as shown in FIG. 1, as well as in other various forms such as cylindrical, polygonal, thin-type, or flat form.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

EXAMPLE

The Example of the present invention will be described in detail with reference to the accompanying diagrams. The following Example 1 and Comparative Examples 1 to 2 adopt a battery structure shown in FIG. 1.

Example 1

90% by weight of a lithium cobalt oxide ($LiCoO_2$) powder, 2% by weight of acetylene black, 3% by weight of graphite, and 5% by weight of polyvinylidene fluoride as a binder were slurried in N-methylpyrrolidone as a solvent. The slurry was coated onto a 20 μm-thick aluminum foil. The coated aluminum foil was dried and was rolled. A circular section having a diameter of 15 mm was taken off from the positive electrode sheet to prepare a positive electrode. The positive electrode had a weight of 17.7 mg.

90% by weight of an $Li_4Ti_5O_{12}$ powder as a negative electrode active material, 5% by weight of artificial graphite as a conductive material, and 5% by weight of polyvinylidene fluoride (PVdF) were added to and mixed with an N-methylpyrrolidone (NMP) solution. The slurry thus obtained was coated onto a 20 μm-thick aluminum foil, and the coated aluminum foil was dried and rolled. A circular section having a diameter of 16 mm was taken off from the negative electrode sheet to prepare a negative electrode. The negative electrode had a weight of 15.4 mg.

A porous film of polypropylene was used as a separator.

Bispentafluoroethylsulfonylamide 1-methyl-3-(3,3,4,4,4-pentafluorobutyl)imidazolium (MPFBI.BETI) was synthesized from N-methylimidazole and 3,3,4,4,4-pentafluorobutyl iodide according to the method described in R. P. Singh, S. Manandhar, J. M. Shreeve; Tetrahedron Lett. 43 (2002) 9497.

1% by weight of bispentafluoroethylsulfonylamide 1-methyl-3-(3,3,4,4,4-pentafluorobutyl)imidazolium (MPFBI.BETI) was added to an electrolyte prepared by dissolving 0.75 mol/L of lithium bispentafluoroethylsulfonylamide (Li-BETI) in bispentafluoroethylsulfonylamidel-ethyl-3-methylimidazolium (EMI.BETI) to prepare an ionic liquid.

The positive electrode was housed in a coin-type positive electrode container. The negative electrode was disposed on the positive electrode through the separator. The ionic liquid was then added, followed by vacuum impregnation. Thereafter, the coin-type negative electrode container was fixed by caulking through a gasket to prepare a coin-type rechargeable nonaqueous electrolyte battery. The reference capacity calculated from the amount of the active material contained in the electrode was 1.24 mAh.

Comparative Example 1

A rechargeable nonaqueous electrolyte battery was prepared in the same manner as in Example 1, except that bispentafluoroethylsulfonylamidel-methyl-3-(3,3,4,4,4-pentafluorobutyl)-imidazolium (MPFBI.BETI) was not added.

Comparative Example 2

A rechargeable nonaqueous electrolyte battery was prepared in the same manner as in Example 1, except that 1% by weight of trimethyl phosphite was used as a surfactant instead of MPFBI.BETI.

For the rechargeable batteries with a nonaqueous electrolyte prepared in Example 1 and Comparative Examples 1 and 2, constant current charging at 0.2 mA up to 2.7 V was carried out. After the voltage reached 2.7 V, the voltage 2.7 V was held for charging at the constant voltage until the total charging time reached 10 hr. Discharging was then carried out at a constant current of 0.2 mA until the voltage decreased to 1.5 V. Thereafter, the characteristics were evaluated under the following conditions. Constant current charging was carried out at 0.2 mA until the voltage reached 2.7 V. After the voltage reached 2.7 V, the voltage 2.7 V was held for charging at the constant voltage until the total charging time reached 10 hr, or until the charging current converged to 0.03 mA. Discharging was carried out at a constant current until the voltage decreased to 1.5 V. For each cycle, discharging was carried out in the order of 0.2 mA, 0.5 mA, 1.0 mA, and 2.0 mA. The open-circuit time for charging and discharging was 15 min.

Figure 2:
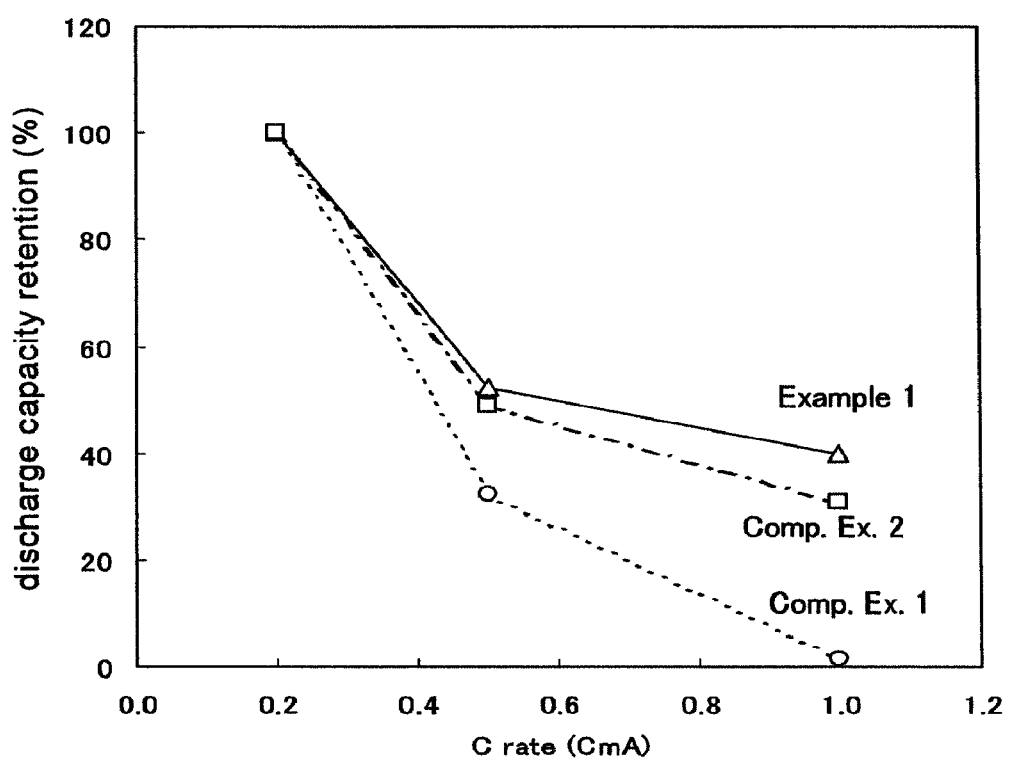
FIG. 2 is a diagram showing the characteristics of rechargeable batteries with a nonaqueous electrolyte prepared in Example and Comparative Examples.

The change of the charge capacity obtained by the above evaluation was as shown in FIG. 2. In FIG. 2, the change of the discharge capacity is shown in terms of discharge capacity retention by presuming the discharge capacity of each battery in the second cycle from the start of the evaluation to be 100%.

As is apparent from FIG. 2, the rechargeable battery of Example 1 in which MPFBI.BETI was added, had a higher discharge capacity retention than the battery of Comparative Example 1 in which any additive was not added, and the battery of Comparative Example 2 in which trimethyl phosphite was added.

Next, the batteries of Example 1 and Comparative Examples 1 and 2 after the evaluation were stored in an environment of 80° C. for 24 hr. Thereafter, the appearance of the batteries was observed. As a result, it was found that no change in appearance was observed for the batteries of Example 1 and Comparative Example 1, whereas slight liquid leakage was observed around the gasket for the battery of Comparative Example 2.

As described above, according to the present invention, the addition of MPFBI.BETI can realize the provision of a rechargeable nonaqueous electrolyte battery having higher output characteristics and further a rechargeable nonaqueous electrolyte battery which is stable even under a high-temperature environment.

The present invention is not limited to the above embodiments. In practicing the invention, structural elements may be modified and embodied without departing from the spirit of the invention. A plurality of structural elements disclosed in the embodiments may be properly combined to constitute various inventions. For example, some of the structural elements in the embodiments may be omitted. Further, structural elements in different embodiments may be properly combined.

The invention claimed is:

1. A nonaqueous electrolyte battery, comprising
a negative electrode and a positive electrode that comprises or can occlude and release lithium,
a lithium salt-containing ionic liquid, wherein
said ionic liquid comprises a cation represented by formula (1):

$$A^+\text{-}(CH_2)_n\text{—}(CF_2)_m\text{—}CF_3 \quad (1)$$

wherein
$A^+$ represents
an imidazolium structure represented by formula (2):

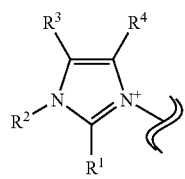

(2)

wherein $R^1$, $R^3$, and $R^4$ each independently represent a substituent having 8 or less carbon atoms and comprising at least one element selected from the group consisting of carbon, hydrogen, and oxygen,
$R^2$ represents a substituent having 1 or more and 8 or less carbon atoms and comprising at least one element selected from the group consisting of carbon, hydrogen, and oxygen,
n is an integer of 2 or more and 10 or less, and
m is an integer of 1 or more and 12 or less.

2. The nonaqueous electrolyte battery according to claim 1, wherein the ionic liquid comprises the cation represented by formula (1) and an anion selected from the group consisting of a bistrifluoromethylsulfonylamide anion and a bispentafluoroethylsulfonylamide anion.

3. The nonaqueous electrolyte battery according to claim 1, wherein, in the formula (1), n=2 and m=1.

4. The nonaqueous electrolyte battery according to claim 1, further comprising a counter anion selected from the group consisting of a tetrafluoroboric acid anion, a hexafluorophosphoric acid anion, a trifluoromethylsulfonic acid anion, a bistrifluoromethylsulfonylamide anion, a bispentafluoroethyl-sulfonylamide anion, and a dicyanamide anion.

5. The nonaqueous electrolyte battery according to claim 1, further comprising a separator between the positive electrode and the negative electrode.

6. The nonaqueous electrolyte battery according to claim 5, wherein the separator comprises polyolefin or polyester.

7. The nonaqueous electrolyte battery according to claim 1, wherein the content of a compound containing the cation is not less than 0.01% by weight and not more than 5% by weight.

8. The nonaqueous electrolyte battery according to claim 1, wherein the ionic liquid comprises not less than 5% by weight of at least one anion selected from the group consisting of $BF_4{-}$, $PF_6{-}$, bistrifluoromethylsulfonylamide anion, and bispentafluoroethyl-sulfonylamide anion.

9. The nonaqueous electrolyte battery according to claim 1, wherein a concentration of the lithium salt in the lithium salt containing ionic liquid is 0.1 to 2.5 mol/liter.

10. The nonaqueous electrolyte battery according to claim 1, wherein the positive electrode comprises a positive electrode active material selected from the group consisting of lithium-containing cobalt composite oxide, lithium-containing nickel cobalt composite oxide, lithium-containing manganese composite oxide, and lithium-containing cobalt nickel manganese composite oxide.

11. The nonaqueous electrolyte battery according to claim 10, wherein the positive electrode active material is lithium cobalt oxide.

12. The nonaqueous electrolyte battery according to claim 1, wherein the negative electrode comprises a negative electrode active material comprising lithium titanium oxide or iron sulfide.

13. The nonaqueous electrolyte battery according to claim 12, wherein the negative electrode active material comprises a charge/discharge potential of not less than 0.5 V and not more than 2V.

14. The nonaqueous electrolyte battery according to claim 1, further comprising at least one binder selected from the group consisting of polytetrafluoroethylene, polyvinylidene fluoride, ethylene-propylene-diene copolymer, and styrene-butadiene rubber.

15. The nonaqueous electrolyte battery according to claim 1, wherein at least one of the positive electrode and the negative electrode further comprises an electron conductive material.

16. The nonaqueous electrolyte battery according to claim 1, wherein at least one of the positive electrode and the negative electrode is in pellet or sheet form.

17. The nonaqueous electrolyte battery according to claim 1, wherein the lithium salt is at least one selected from the group consisting of lithium tetrafluoroborate, lithium hexafluorophosphate, lithium trifluoromethylsulfonate, lithium bistrifluoromethylsilfonylamide, lithium bispentafluoroethylsulfonylamide, and lithium dicyanamide.

18. The nonaqueous electrolyte battery according to claim 12, wherein the negative electrode active material is $Li_4Ti_5O_{12}$.

19. The nonaqueous electrolyte battery according to claim 15, wherein the electron conductive material is graphite.

* * * * *